(12) United States Patent
Ohsawa et al.

(10) Patent No.: US 10,312,524 B2
(45) Date of Patent: Jun. 4, 2019

(54) ELECTRICAL CONNECTION STRUCTURE

(71) Applicants: NISSAN MOTOR CO., LTD., Yokohama-shi, Kanagawa (JP); SANYO CHEMICAL INDUSTRIES, LTD., Kyoto-shi, Kyoto (JP)

(72) Inventors: Yasuhiko Ohsawa, Kanagawa (JP); Hajime Satou, Kanagawa (JP); Hiroshi Akama, Kanagawa (JP); Hideaki Horie, Kanagawa (JP); Yusuke Mizuno, Kyoto (JP); Hiroshi Fukumoto, Kyoto (JP); Masatoshi Okura, Kyoto (JP); Yasuhiro Shindo, Kyoto (JP); Yasuhiro Tsudo, Kyoto (JP)

(73) Assignees: NISSAN MOTOR CO., LTD., Yokohama-shi (JP); SANYO CHEMICAL INDUSTRIES, LTD., Kyoto-shi (JP)

( * ) Notice: Subject to any disclaimer, the term of this patent is extended or adjusted under 35 U.S.C. 154(b) by 86 days.

(21) Appl. No.: 15/506,084

(22) PCT Filed: Aug. 21, 2015

(86) PCT No.: PCT/JP2015/073461
§ 371 (c)(1),
(2) Date: Feb. 23, 2017

(87) PCT Pub. No.: WO2016/031689
PCT Pub. Date: Mar. 3, 2016

(65) Prior Publication Data
US 2018/0226654 A1 Aug. 9, 2018

(30) Foreign Application Priority Data

Aug. 25, 2014 (JP) .................................. 2014-170633

(51) Int. Cl.
*H01M 2/20* (2006.01)
*H01M 4/66* (2006.01)
(Continued)

(52) U.S. Cl.
CPC ............ *H01M 4/667* (2013.01); *H01M 2/20* (2013.01); *H01M 2/22* (2013.01); *H01M 2/26* (2013.01);
(Continued)

(58) Field of Classification Search
None
See application file for complete search history.

(56) References Cited

U.S. PATENT DOCUMENTS 6,171,460 B1 * 1/2001 Bill ..................... H01M 4/664
204/291
8,445,139 B2 5/2013 Hosaka et al.
(Continued)

FOREIGN PATENT DOCUMENTS

JP 62-15762 A 1/1987
JP 1-100864 A 4/1989
(Continued)

OTHER PUBLICATIONS

JP 2010-251159 A machine English translation (Year: 2010).*

*Primary Examiner* — Scott J. Chmielecki
(74) *Attorney, Agent, or Firm* — Foley & Lardner LLP

(57) ABSTRACT

The present invention provides a means for improving the output performance of a battery.
An electrical connection structure of the present invention includes a current collector which includes a conductive resin layer containing a polymer material and a conductive filler and a conductive member which is in electrical contact with the conductive filler.

12 Claims, 4 Drawing Sheets

(51) Int. Cl.
*H01M 2/22* (2006.01)
*H01M 4/64* (2006.01)
*H01M 2/26* (2006.01)
*H01M 10/0525* (2010.01)
*H01M 10/052* (2010.01)

(52) U.S. Cl.
CPC ............ *H01M 2/266* (2013.01); *H01M 4/64* (2013.01); *H01M 4/66* (2013.01); *H01M 4/663* (2013.01); *H01M 4/668* (2013.01); *H01M 10/0525* (2013.01); *H01M 10/052* (2013.01); *H01M 2220/20* (2013.01)

(56) References Cited

U.S. PATENT DOCUMENTS

2013/0022865 A1* 1/2013 Nishinaka ............. H01M 4/661
                                                   429/211
2013/0298363 A1* 11/2013 Kazaryan ............... H01G 11/04
                                                   29/25.03
2013/0309565 A1* 11/2013 He ........................ H01M 4/668
                                                   429/211
2014/0186699 A1    7/2014 Kato et al.

FOREIGN PATENT DOCUMENTS

| JP | 2006-190649 A | 7/2006 |
|----|---|---|
| JP | 2010-73421 A | 4/2010 |
| JP | 2010-157449 A | 7/2010 |
| JP | 2010-251159 A | 11/2010 |
| JP | 2010251159 A * | 11/2010 |
| JP | 2010-287549 A | 12/2010 |
| WO | WO 2012/161180 A1 | 11/2012 |

\* cited by examiner

ELECTRICAL CONNECTION STRUCTURE

TECHNICAL FIELD

The present invention relates to an electrical connection structure.

BACKGROUND ART

In recent years, expectations are growing for widespread use of various electric vehicles with a view to solving environment and energy problems. As a key to widespread use of these electric vehicles, vigorous development of secondary batteries as an in-vehicle power source such as a power source for driving a motor is under way. However, in order for the electric vehicles to gain wide acceptance, the batteries need to have higher performance and be less expensive. Further, there is a need for the single-charge travel distance of the electric vehicles to approach that of gasoline engine vehicles, giving rise to the demand for batteries having higher energy density. In order to allow a battery to have a high energy density, there is a need to reduce a battery member, which is not directly involved in a battery reaction, as much as possible. A bipolar type secondary battery has been proposed as a battery in which a current collecting tab of a battery single cell, a bus bar for connection between single cells, and the like can be saved and which is very excellent in volume efficiency and suitable for vehicle installation. The bipolar type secondary battery uses a bipolar type electrode in which a positive electrode is formed on one surface of one current collector and a negative electrode is formed on the other surface thereof. Further, the bipolar type secondary battery has a structure in which a plurality of the bipolar type electrodes are laminated via a separator including an electrolyte layer such that the positive electrode and the negative electrode face each other. Therefore, in this bipolar type secondary battery, one battery cell (single battery) is formed by the positive electrode, the negative electrode, and the separator (the electrolyte layer) which are provided between the current collector and the current collector.

For example, in order to improve an output density per weight of the secondary battery, Patent Literature 1 has proposed to use a current collector containing a polymer material and a conductive filler.

CITATION LIST

Patent Literatures

Patent Literature 1: JP 2006-190649 A (corresponding to US 2008/0220330 A1)

SUMMARY OF INVENTION

Technical Problem

However, in the technique described in Patent Literature 1, the output performance of the battery is not sufficient and thus there is a demand for further improvement in the output performance.

In this regard, an object of the present invention is to provide a means for improving the output performance of a battery.

Solution to Problem

The present inventors conducted intensive studies. As a result, they found that the above-described problem is solved by an electrical connection structure in which a conductive member, which is in electrical contact with a conductive filler included in a conductive resin layer, is provided with respect to a current collector including the conductive resin layer.

BRIEF DESCRIPTION OF DRAWINGS

In FIG. 1, reference numeral 10a represents a lithium ion secondary battery; reference numeral 11 represents a positive electrode current collector; reference numeral 12 represents a negative electrode current collector; reference numeral 13 represents a positive electrode active material layer; reference numeral 15 represents a negative electrode active material layer; reference numeral 17 represents an electrolyte layer; reference numeral 19 represents a single battery layer; reference numeral 21 represents a power generating element; reference numeral 25 represents a positive electrode current collecting plate; reference numeral 27 represents a negative electrode current collecting plate; and reference numeral 29 represents a battery outer casing material.

In FIG. 2, reference numeral 10b represents a lithium ion secondary battery; reference numeral 11 represents a positive electrode current collector; reference numeral 11a represents an outermost layer current collector of the positive electrode side; reference numeral 11b represents an outermost layer current collector of the negative electrode side; reference numeral 12 represents a negative electrode current collector; reference numeral 13 represents a positive electrode active material layer; reference numeral 15 represents a negative electrode active material layer; reference numeral 17 represents an electrolyte layer; reference numeral 19 represents a single battery layer; reference numeral 21 represents a power generating element; reference numeral 25 represents a positive electrode current collecting plate; reference numeral 27 represents a negative electrode current collecting plate; reference numeral 29 represents a battery outer casing material; and reference numeral 31 represents a sealing portion.

In FIG. 3, reference numeral 40 represents an electrical connection structure; reference numeral 41 represents a current collector including a conductive resin layer; and reference numeral 42 represents a conductive member.

DESCRIPTION OF EMBODIMENTS

Figure 1:
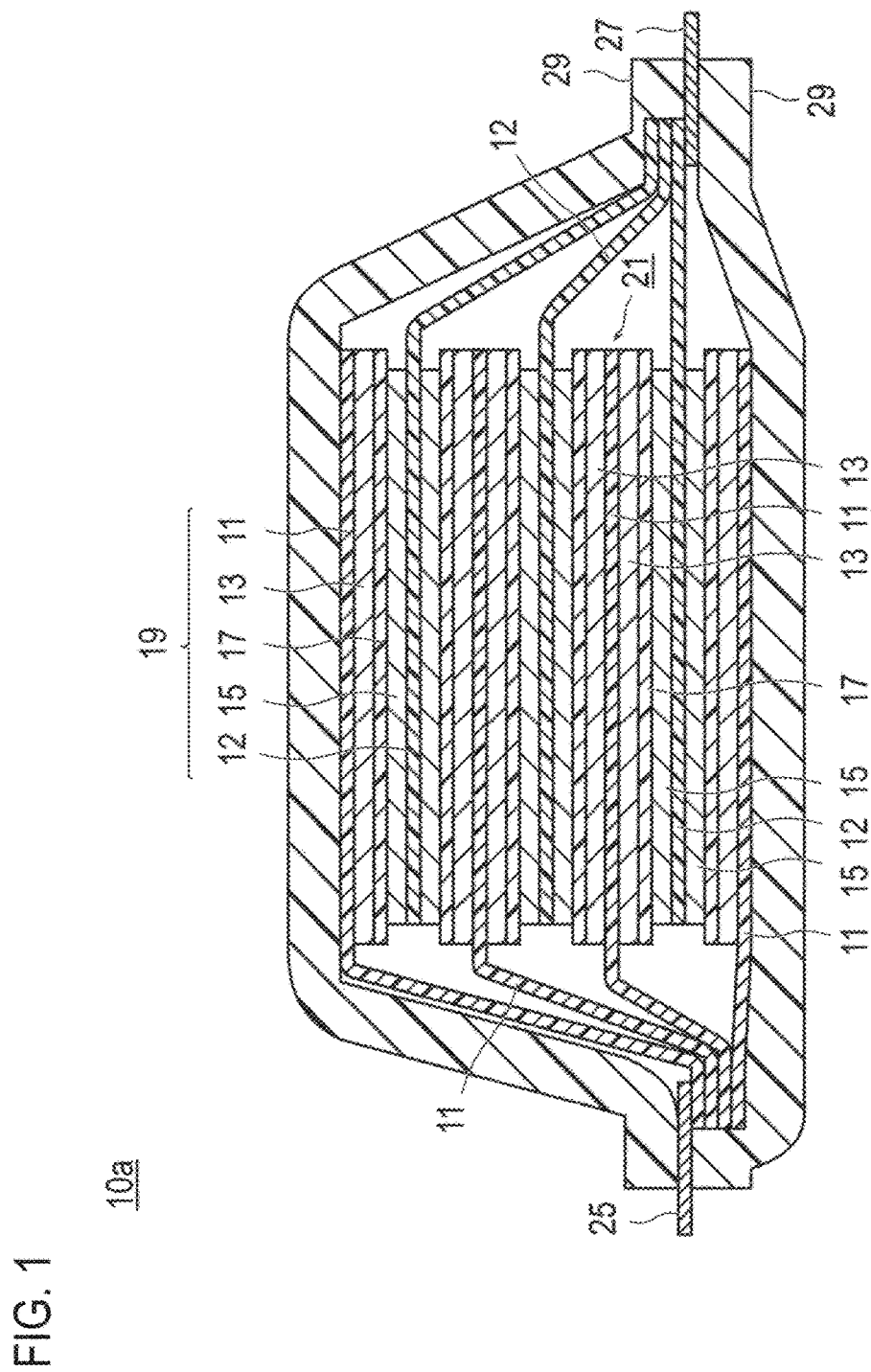
FIG. 1 is a schematic cross-sectional view illustrating a basic configuration of a flat type (laminate type) which is not a bipolar type, non-aqueous electrolyte lithium ion secondary battery, which is an embodiment of a lithium ion secondary battery.

According to an embodiment of the present invention, there is provided an electrical connection structure including a current collector which includes a conductive resin layer containing a polymer material and a conductive filler and a conductive member which is in electrical contact with the conductive filler. According to the above-described embodiment, the conductive filler in the conductive resin layer of the current collector and the conductive member provided on the current collector are in electrical contact with each other. Therefore, the contact resistance between the current collector including the conductive resin layer and a current collecting plate is reduced.

First, a lithium ion secondary battery suitably using the electrical connection structure according to an embodiment will be described, but is not limited only to the following embodiments. Incidentally, the same reference numerals are assigned to the same elements in the description of the drawings, and duplicate descriptions are omitted. In addition, the scale of the drawings includes some exaggeration for descriptive reasons, and may thus be different from the actual dimension.

A lithium ion secondary battery, which is a target of this embodiment, only needs to include an electrical connection structure to be described below, and the other constituent requirements should not be particularly limited.

For example, when the lithium ion secondary batteries are classified by the form and the structure, the electrical connection structure is applicable to every known form and structure of laminate type (flat type) batteries, winding type (barrel type) batteries, and the like. When the laminate type (flat type) battery structure is employed, long-term reliability is ensured by a sealing technique such as simple thermocompression. The laminate type (flat type) battery structure is advantageous in terms of cost and workability.

Further, when lithium ion secondary batteries are classified by the electrical connection manner (electrode structure), the electrical connection structure is applicable to both non-bipolar type (inner parallel connection type) batteries and bipolar type (inner serial connection type) batteries.

When lithium ion secondary batteries are classified by the type of electrolyte layers thereof, the electrical connection structure is applicable to any batteries including conventionally-known types of electrolyte layers, such as liquid electrolyte type batteries whose electrolyte layers are composed of a liquid electrolyte such as a non-aqueous electrolyte solution and polymer batteries whose electrolyte layers are composed of a polymer electrolyte. The polymer batteries are further classified into gel electrolyte batteries employing a polymer gel electrolyte (also simply referred to as a gel electrolyte) and solid polymer (all-solid-state) batteries employing a polymer solid electrolyte (also simply referred to as polymer electrolyte).

FIG. 1 is a schematic cross-sectional view illustrating a basic configuration of a non-aqueous electrolyte lithium ion secondary battery which is a flat type (laminate type) and not a bipolar type (hereinafter, also simply referred to as the "laminate type battery"). As illustrated in FIG. 1, a laminate type battery 10a of this embodiment has a structure in which a power generating element 21 with a substantially rectangular shape, in which a charge and discharge reaction actually occurs, is sealed inside of a battery outer casing material 29 serving as an outer casing body. Herein, the power generating element 21 has a configuration in which a positive electrode, an electrolyte layer 17, and a negative electrode are laminated. The positive electrode has a configuration in which a positive electrode active material layer 13 is disposed to both surfaces of a positive electrode current collector 11. The negative electrode has a configuration in which a negative electrode active material layer 15 is disposed on both surfaces of a negative electrode current collector 12. Specifically, one positive electrode active material layer 13 and the negative electrode active material layer 15 adjacent thereto are disposed to face each other via the electrolyte layer 17, and the negative electrode, the electrolyte layer, and the positive electrode are laminated in this order. Accordingly, the positive electrode, the electrolyte layer, and the negative electrode adjacent to each other constitute one single battery layer 19. Therefore, it can be said that, when a plurality of the single battery layers 19 are laminated, the laminate type battery 10a illustrated in FIG. 1 has a configuration in which electrically parallel connection is made among them.

Incidentally, on the outermost layer positive electrode current collector which is located on both outermost layers of the power generating element 21, the positive electrode active material layer 13 is disposed only on one surface. However, an active material layer may be provided on both surfaces. That is, not only a current collector exclusive for an outermost layer in which an active material layer is provided only on one surface can be achieved but also a current collector having an active material layer on both surfaces can be directly used as a current collector of an outermost layer. Further, by reversing the arrangement of the positive electrode and the negative electrode of FIG. 1, it is also possible that the outermost layer negative electrode current collector is located on both outermost layers of the power generating element 21 and a negative electrode active material layer is disposed on one surface or both surfaces of the same outermost layer negative electrode current collector.

The positive electrode current collector 11 and negative electrode current collector 12 have a structure in which each of the positive electrode current collecting plate 25 and negative electrode current collecting plate 27, which conductively communicate with each electrode (positive electrode and negative electrode), is attached and inserted to a terminal of the battery outer casing material 29 so as to be led to the outside of the battery outer casing material 29. The positive electrode current collecting plate 25 and the negative electrode current collecting plate 27 may be attached by, for example, ultrasonic welding or resistance welding, to the positive electrode current collector 11 and the negative electrode current collector 12 of the respective electrodes via positive electrode leads and negative electrode leads (not illustrated) as necessary.

Figure 2:
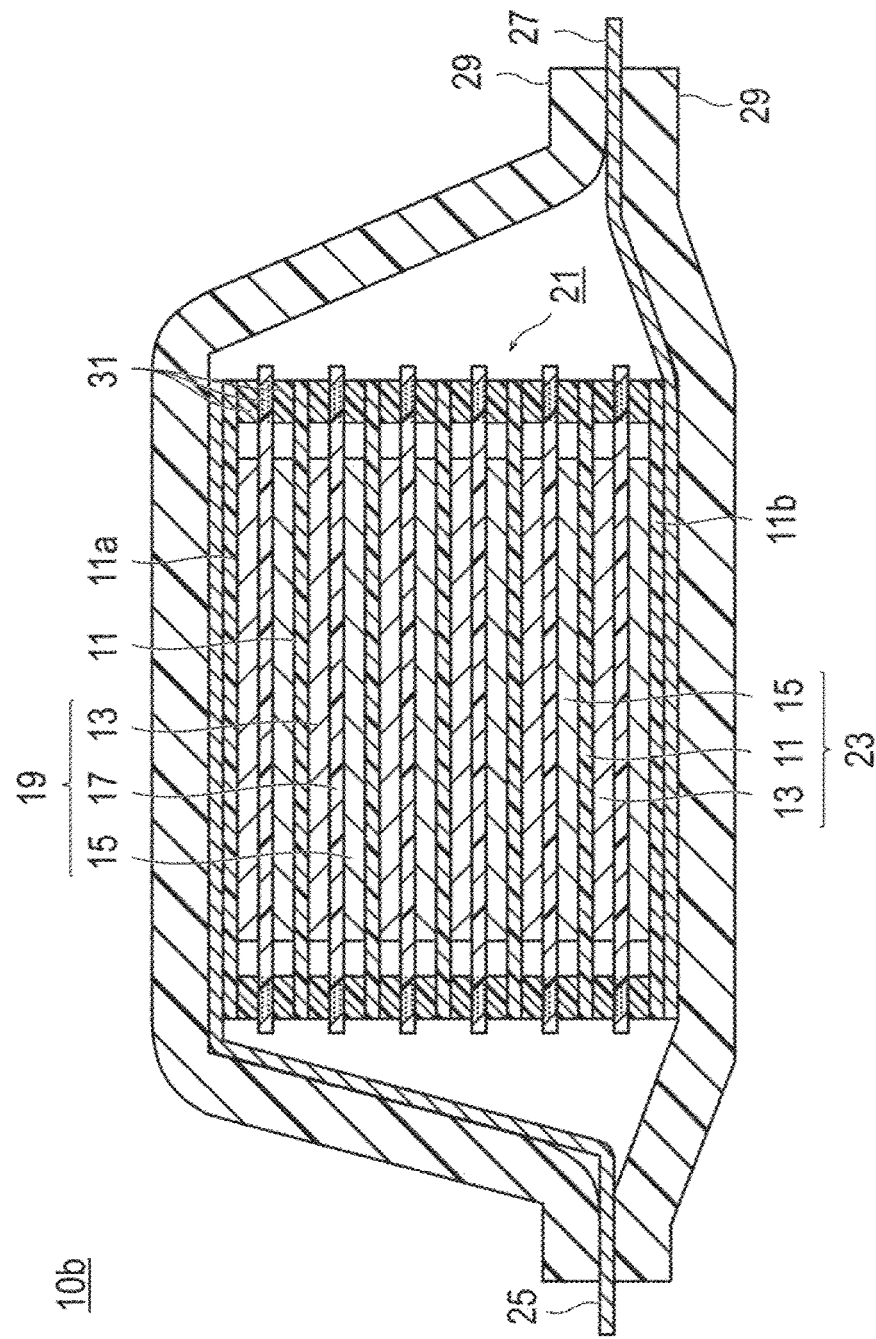
FIG. 2 is a schematic cross-sectional view illustrating a basic configuration of a bipolar type lithium ion secondary battery which is another embodiment of the lithium ion secondary battery.

FIG. 2 is a schematic cross-sectional view schematically illustrating a basic configuration of a bipolar type non-aqueous electrolyte lithium ion secondary battery (hereinafter, also simply referred to as the "bipolar type battery") 10b. The bipolar type battery 10b illustrated in FIG. 2 has a structure in which the power generating element 21 with a substantially rectangular shape, in which a charge and discharge reaction actually occurs, is sealed in the inside of a laminate film 29 serving as a battery outer casing material.

As illustrated in FIG. 2, the power generating element 21 of the bipolar type battery 10b includes a plurality of bipolar type electrodes 23 each of which has the positive electrode active material layer 13 formed on one surface of the current collector 11 to be electrically connected thereto and the negative electrode active material layer 15 formed on the other surface of the current collector 11 to be electrically connected thereto. Each of the bipolar type electrodes 23 is laminated via the electrolyte layer 17 to form the power generating element 21. Incidentally, the electrolyte layer 17 has a configuration in which an electrolyte is held at the center portion in the plane direction of a separator serving as a base material. At this time, each of the bipolar type electrodes 23 and each of the electrolyte layers 17 are alternately laminated such that the positive electrode active material layer 13 of one bipolar type electrode 23 faces the negative electrode active material layer 15 of another bipolar type electrode 23 adjacent to the one bipolar type electrode 23 via the electrolyte layer 17. That is, the electrolyte layer 17 is disposed to be interposed between the positive electrode active material layer 13 of one bipolar type electrode 23 and the negative electrode active material layer 15 of another bipolar type electrode 23 adjacent to the one bipolar type electrode 23.

The positive electrode active material layer 13, the electrolyte layer 17, and the negative electrode active material layer 15 adjacent to each other constitute one single battery layer 19. Therefore, it can also be said that the bipolar type battery 10b has a configuration in which the single battery layers 19 are laminated. Further, for the purpose of preventing liquid junction caused by leakage of the electrolyte solution from the electrolyte layer 17, a sealing portion (insulation layer) 31 is provided at the outer periphery of each of the single battery layer 19. Incidentally, only one surface of an outermost layer current collector of the positive electrode side 11a located at the outermost layer of the power generating element 21 is provided with the positive electrode active material layer 13. Further, only one surface of an outermost layer current collector of the negative electrode side 11b located at the outermost layer of the power generating element 21 is provided with the negative electrode active material layer 15. However, the positive electrode active material layer 13 may be formed on both surfaces of the outermost layer current collector of the positive electrode side 11a. Similarly, the negative electrode active material layer 15 may be formed on both surfaces of the outermost layer current collector of the negative electrode side 11b.

Further, in the bipolar type battery 10b illustrated in FIG. 2, the positive electrode current collecting plate 25 is disposed to be adjacent to the outermost layer current collector of the positive electrode side 11a and extends to be exposed on the outside of the laminate film 29 serving as a battery outer casing material. On the other hand, the negative electrode current collecting plate 27 is disposed to be adjacent to the outermost layer current collector of the negative electrode side 11b and similarly extends to be exposed on the outside of the laminate film 29 serving as a battery outer casing.

In the bipolar type battery 10b illustrated in FIG. 2, generally, the sealing portion 31 is provided at the periphery of each of the single battery layers 19. This sealing portion 31 is provided in order to prevent the contact between the current collectors 11 adjacent to each other inside the battery or occurrence of a short circuit caused by slight unevenness at the end portion of the single battery layer 19 in the power generating element 21. By providing such sealing portions 31, it is possible to ensure long-term reliability and safety and to provide the bipolar type battery 10b with high quality.

Incidentally, the number of the single battery layers 19 laminated is adjusted depending on a desired voltage. Further, the number of the single battery layers 19 laminated in the bipolar type battery 10b may be lowered as long as sufficient output can be ensured even when the thickness of the battery is made thinner as much as possible. Also for the bipolar type battery 10b, there is a need to prevent external damage at the time of operation and avoid environmental worsening. Therefore, the bipolar type battery 10b preferably has a structure in which the power generating element 21 is sealed in the laminate film 29, which is a battery outer casing material, under reduced pressure, and the positive electrode current collecting plate 25 and the negative electrode current collecting plate 27 are exposed on the outside of the laminate film 29.

Figure 3:
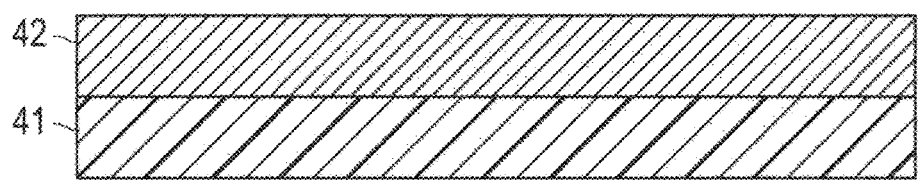
FIG. 3 is a schematic cross-sectional view illustrating an embodiment of an electrical connection structure.

FIG. 3 is a schematic cross-sectional view illustrating an embodiment of the electrical connection structure. An electrical connection structure 40 illustrated in FIG. 3 includes a conductive member 42 on the surface of a current collector 41 including a conductive resin layer.

Figure 4:
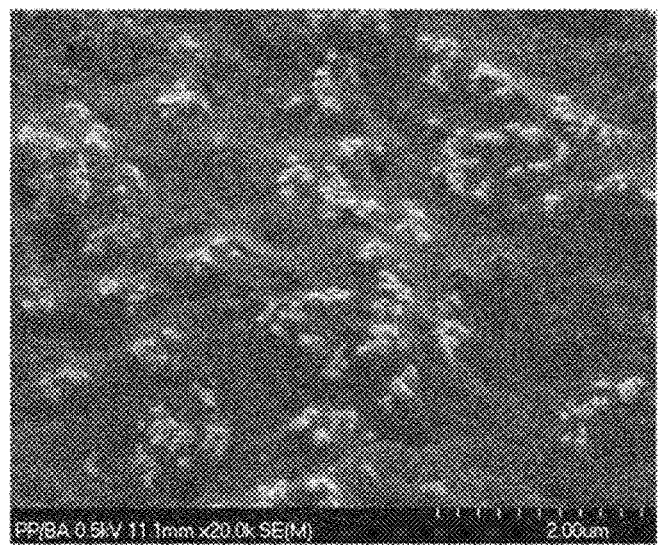
FIG. 4 is a scanning electron microscope (SEM) photograph obtained by observing the surface of a current collector which includes a conductive resin layer comprised of polypropylene containing 20% by mass of acetylene black, from the upper 45° direction.
Figure 5:
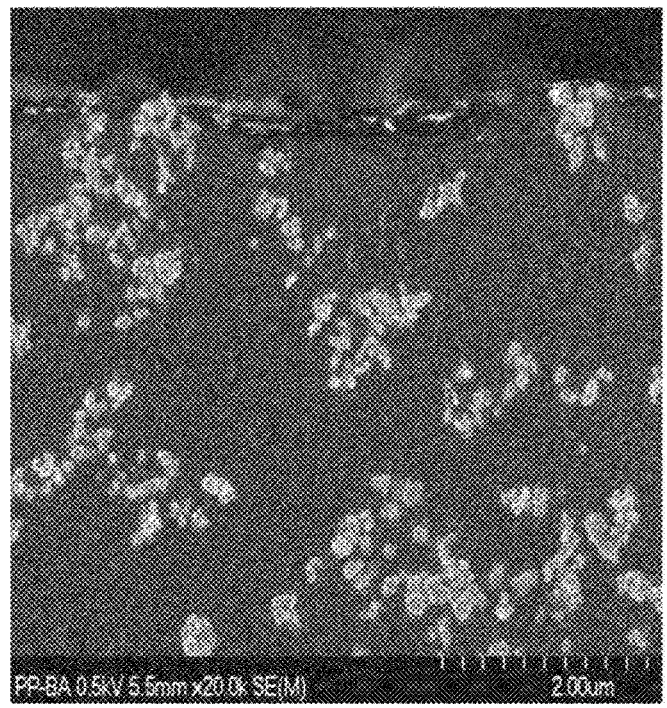
FIG. 5 is a photograph obtained by observing the cross-section of the current collector illustrated in FIG. 4 with a SEM.

For the purpose of improving an output density per weight of a secondary battery, Patent Literature 1 proposes to use a current collector containing a polymer material and a conductive filler. However, it is found that the output performance of the secondary battery using this current collector is not sufficient. In this regard, the present inventors specifically investigated this problem, and as a result, they estimated that a high contact resistance between the current collector containing a polymer material and a conductive filler and the current collecting plate mainly comprised of a metal is one of the causes of this problem. For this reason, the present inventors focused on the electrical contact between the current collector and the current collecting plate. FIG. 4 is a scanning electronmicroscope (SEM) photograph obtained by observing the surface of a current collector which includes a conductive resin layer comprised of polypropylene containing 20% by mass of acetylene black serving as a conductive filler, from the upper 45° direction. In FIG. 4, those observed as white are acetylene black and those observed as black are polypropylene. As seen from FIG. 4, unevenness with a size of about 1 μm is present on the surface of the current collector, and acetylene black is exposed at parts of the unevenness. FIG. 5 is a photograph obtained by observing the cross-section of the same current collector in the same manner with a SEM, and it is found that a lot of acetylene black is present inside the current collector and a proportion of acetylene black exposed on the surface is small. From this observation result, the present inventors estimated that since the current collector including a conductive resin layer and the current collecting plate mainly comprised of a metal are partially in point contact with each other and thus sufficient contact cannot be performed two-dimensionally and three-dimensionally, the electrical connection is difficult to achieve and the contact resistance may be increased.

Figure 6:
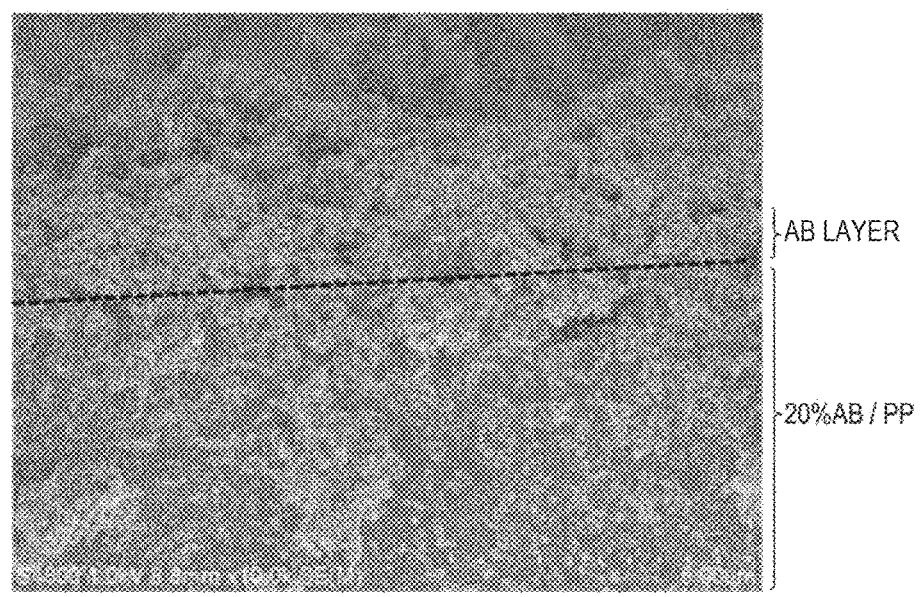
FIG. 6 is across-sectional SEM photograph showing an electrical connection structure in which an acetylene black layer is provided as a conductive member on the surface of the current collector which includes a conductive resin layer comprised of polypropylene containing 20% by mass of acetylene black.

In order to solve such a problem, the present inventions conducted intensive studies. As a result, it is found that when a current collector which includes a conductive resin layer containing a polymer material and a conductive filler is provided, and a conductive member electrically connected to the conductive filler is provided thereon, the contact resistance is reduced. FIG. 6 is a cross-sectional SEM photograph showing a part of the electrical connection structure in which an acetylene black layer is provided as a conductive member on the surface of the current collector which includes a conductive resin layer comprised of polypropylene containing 20% by mass of acetylene black. In the part of the electrical connection structure illustrated in FIG. 6, it is found that acetylene black (AB) in the conductive resin layer ("20% AB/PP" in FIG. 6) and the acetylene black layer ("AB layer" in FIG. 6) provided on the surface thereof are in close contact with each other. When such a conductive member is disposed between the current collector and the current collecting plate, two-dimensional and/or three-dimensional contact between the current collector which includes a conductive resin layer containing a polymer material and a conductive filler and the current collecting plate is increased and thus the contact resistance can be reduced. According to this, the output performance of the battery can be improved.

Incidentally, the above description is merely presumption, and the present invention is not limited to the above description.

Hereinafter, the electrical connection structure will be described in more detail.

[Current Collector Including Conductive Resin Layer]

The electrical connection structure includes a current collector which includes a conductive resin layer containing a polymer material and a conductive filler. The polymer material may be a conductive polymer or a polymer having no conductivity. In addition, the polymer can be used alone or can be used as a mixture of two or more kinds thereof. Further, the polymer may be a commercially available product or a synthesis product.

The conductive polymer is selected from materials that have conductivity but do not allow conduction of ions used as a charge transfer medium. It is considered that these conductive polymers show conductivity by the formation of an energy band with a conjugated polyene system thereof. As a typical example, a polyene-based conductive polymer that has been proceeding toward practical use in an electrolytic condenser or the like can be used. Specific examples thereof include polyaniline, polypyrrole, polythiophene, polyacetylene, polyparaphenylene, polyphenylene vinylene, polyacrylonitrile, polyoxadiazole, and mixtures thereof. From the viewpoint of electron conductivity and stable use in a battery, polyaniline, polypyrrole, polythiophene, and polyacetylene are more preferable.

Examples of the polymer material having no conductivity include polyethylene (PE) (high-density polyethylene (HDPE), low-density polyethylene (LDPE), or the like), polypropylene (PP), polystyrene (PS), polyethylene terephthalate (PET), polyether nitrile (PEN), polyimide (PI), polyamide (PA), polyamide imide (PAI), polytetrafluoroethylene (PTFE), styrene-butadiene rubber (SBR), polyacrylonitrile (PAN), polymethyl acrylate (PMA), polymethylmethacrylate (PMMA), polyvinyl chloride (PVC), polyvinylidene fluoride (PVdF), polyvinylidene chloride (PVDC), and mixtures thereof. These materials have a very large potential window to be stable to either of positive and negative potentials and save weight for improvement in battery output density. Among them, from the viewpoint of durability with respect to the electrolyte solution to be used, various polyolefins, such as polypropylene and polyethylene, or a copolymer and mixture thereof are preferable.

The conductive filler to be used is selected from materials having conductivity. Preferably, from the viewpoint of suppressing the ion transmission in the conductive resin layer, a material having no conductivity with respect to ions used as a charge transfer medium is preferably used.

Specifically, a carbon material, aluminum, gold, silver, copper, iron, platinum, chromium, tin, indium, antimony, titanium, nickel, and the like are exemplified, but the materials are not limited thereto. These conductive fillers may be used alone or in combination of two or more kinds thereof. Further, alloy materials thereof such as stainless steel (SUS) may be used. From the viewpoint of corrosion resistance, aluminum, stainless steel, a carbon material, or nickel is preferable, and a carbon material or nickel is more preferable. Furthermore, these conductive fillers may be in the form of a particulate ceramic material or resin material coated therearound with a metal described above by plating or the like.

Examples of the carbon material include at least one selected from the group consisting of acetylene black, carbon black, Vulcan (registered trademark), Black Pearls (registered trademark), carbon nanofiber, Ketjen black (registered trademark), carbon nanotube, carbon nanohorn, carbon nanoballoon, hard carbon, and fullerene. These carbon materials have a very large potential window to be stable to a wide range of positive and negative potentials and are excellent in conductivity. Further, since the carbon materials are very lightweight, mass increase is minimized. Moreover, the carbon materials are often also used as a conductive aid for an electrode, and thus even when the carbon materials are brought into contact with the conductive aid, the carbon materials exhibit very low contact resistance due to the use of the same carbon material. Incidentally, when the carbon material is used as a conductive filler, it is feasible to subject the surface of the carbon material to hydrophobic treatment so as to decrease the compatibility of the electrolyte to the current collector and thereby make it unlikely that the electrolyte will penetrate into pores of the current collector.

The shape of the conductive filler is not particularly limited, and a conventionally-known shape such as a granular shape, a powder shape, a fiber-like shape, a plate-like shape, a lump shape, a cloth shape, or a mesh-like shape can be selected appropriately. For example, when conductivity is intended to be provided in a wide range, a conductive filler having a granular shape is preferably used. On the other hand, when conductivity is intended to be further improved in a specific direction, a conductive filler having a shape with a certain directionality such as a fiber-like shape is preferably used.

The average particle diameter of the conductive filler is not particularly limited, but is preferably about 0.01 to 10 µm, more preferably 0.01 to 3 µm, and further preferably about 0.01 to 1 µm. Incidentally, in the present specification, the "particle diameter" means the greatest length L between any two points on the circumference of the conductive filler. For a value of the "average particle diameter", a value is employed which is calculated with an observation means, such as a scanning electron microscope (SEM) or a transmission electron microscope (TEM), as an average value of particle diameters of the particles observed in several to several tens of fields of view.

When the conductive filler has a fiber-like shape, the average fiber length thereof is not particularly limited, but is preferably 0.1 to 100 µm. Incidentally, in the present specification, for the average fiber length, a value is employed which is calculated with an observation means, such as a scanning electron microscope (SEM) or a transmission electron microscope (TEM), as an average value of fiber lengths of the fibers observed in several to several tens of fields of view. Further, when the conductive filler has a fiber-like shape, the average diameter thereof is also not particularly limited, but is preferably 0.01 to 10 µm, more preferably 0.01 to 3 µm, and further preferably 0.01 to 1 µm.

The content of the polymer material in the conductive resin layer is not particularly limited, but is preferably 10 to 95 parts by mass and more preferably 12 to 90 parts by mass when the total amount of the polymer material and the conductive filler in the conductive resin layer is considered as 100 parts by mass.

Further, the content of the conductive filler in the conductive resin layer is also not particularly limited. However, the content of the conductive filler is preferably 5 to 90 parts by mass and more preferably 10 to 88 parts by mass when the total amount of the polymer material and the conductive filler in the conductive resin layer is considered as 100 parts by mass. When such an amount of the conductive filler is added to the polymer material, sufficient conductivity can be provided to the current collector while an increase in mass of the current collector is suppressed.

In the conductive resin layer, other additives may be contained in addition to the polymer material and the conductive filler. Examples of the other additives include carboxylic acid-modified polypropylene such as maleic anhydride modified polypropylene. The added amount of the other additives is not particularly limited, but is preferably 1 to 25 parts by mass with respect to total 100 parts by mass of the polymer material and the conductive filler.

The thickness of the current collector including a conductive resin layer is preferably 1 to 200 more preferably 3 to 150 μm, and further preferably 5 to 100 μm.

The method for producing a current collector including a conductive resin layer is not particularly limited, and for example, a method is mentioned in which each component of a polymer material, a conductive filler, and as necessary, an additive is melted and kneaded by an extruder or the like and the melted-and-kneaded material is subjected to rolling by a heat pressing device.

Incidentally, the current collector (the conductive resin layer) may have a single layer structure or a laminate structure obtained by appropriately combining layers formed from these materials. Alternatively, the current collector may have another layer in addition to the conductive resin layer. As another layer, for example, from the viewpoint of lightness of the current collector, there are mentioned a conductive resin layer formed from a resin having conductivity or a metal layer. The former is preferable from the viewpoint of lightness of the current collector. In addition, the latter is preferable from the viewpoint of blocking the movement of lithium ions between the single battery layers.

The electrical connection structure may be provided on the outermost layer current collector of the positive electrode side, may be provided on the outermost layer current collector of the negative electrode side, or may be provided on both the outermost layer current collector of the positive electrode side and the outermost layer current collector of the negative electrode side.

[Conductive Member]

The electrical connection structure includes the conductive member which is in electrical contact with the conductive filler included in the conductive resin layer of the current collector.

The material of the conductive member is not particularly limited, but it is preferable to contain at least one conductive material selected from the group consisting of at least one metal selected from the group consisting of a metal which has an ionization tendency lower than that of iron, iron, titanium, zirconium, tantalum, and niobium, an alloy having the metal as a main component, and a conductive carbon. The reason for this is that these materials are less likely to form an oxide film having insulating properties on the surface thereof and the electrical contact with the conductive filler is maintained over a long time.

More specifically, specific examples of the metal which has anionization tendency lower than that of iron include cobalt, nickel, tin, antimony, copper, silver, palladium, iridium, platinum, and gold. Since the metal which has an ionization tendency lower than that of iron has small resistance even when the oxide film is formed, the contact resistance between the current collector and the current collecting plate can be reduced. Examples of the alloy include stainless steel (SUS).

Further, specific examples of the conductive carbon include at least one selected from the group consisting of acetylene black, carbon black, Vulcan (registered trademark), Black Pearls (registered trademark), carbon nanofiber, Ketjen black (registered trademark), carbon nanotube, carbon nanohorn, carbon nanoballoon, hard carbon, and fullerene.

The shape of the conductive material is not particularly limited, and a conventionally-known shape such as a granular shape, a powder shape, a fiber-like shape, a plate-like shape, a lump shape, a cloth shape, or a mesh-like shape can be selected appropriately.

The average particle diameter (the average particle diameter of the primary particles) of the material of the conductive member is not particularly limited, but is preferably about 0.01 to 10 μm, more preferably about 0.01 to 3 μm, and further preferably about 0.01 to 1 μm. With such a size, the conductive material can effectively contact the unevenness on the surface of the current collector. Therefore, the electrical contact between the current collector and the conductive member can be further increased. Incidentally, in the present specification, the "particle diameter" means the greatest length L between any two points on the circumference of the conductive material. For a value of the "average particle diameter", a value is employed which is calculated with an observation means, such as a scanning electron microscope (SEM) or a transmission electron microscope (TEM), as an average value of particle diameters of the particles observed in several to several tens of fields of view. Incidentally, in Examples, the size of the material of the conductive member is described as the standard particle diameter range of the primary particles, but the standard particle diameter range is preferably included in the above average particle diameter range.

When the conductive material has a fiber-like shape, the average fiber length thereof is not particularly limited, but is preferably 0.1 to 100 μm. Incidentally, in the present specification, for the average fiber length, a value is employed which is calculated with an observation means, such as a scanning electron microscope (SEM) or a transmission electron microscope (TEM), as an average value of fiber lengths of the particles observed in several to several tens of fields of view. Further, when the conductive material has a fiber-like shape, the average diameter thereof is also not particularly limited, but is preferably 0.01 to 10 μm, more preferably 0.01 to 3 μm, and further preferably 0.01 to 1 With such a size, the conductive material can effectively contact the unevenness on the surface of the current collector. Therefore, the electrical contact between the current collector and the conductive member can be further increased. Furthermore, when the conductive material has a fiber-like shape, the two-dimensional (horizontal) electrical contact can be increased only by adding a small amount of the conductive material, which is preferable.

Among these, from the viewpoint of ease of availability and effective function with ease as a conductive aid in addition to the viewpoint that an insulating film is less likely to be formed on the surface thereof as described above, the conductive member is preferably comprised of a conductive carbon.

Further, the conductive member may contain a polymer material in addition to the above-described conductive material. Examples of the polymer material usable in the conductive member include a conductive polymer such as polyaniline, polypyrrole, polythiophene, polyacetylene, polyparaphenylene, polyphenylene vinylene, polyacrylonitrile, or polyoxadiazole; a thermoplastic polymer having no conductivity such as polyethylene (high-density polyethylene (HDPE), low-density polyethylene (LDPE), or the like), polypropylene, polystyrene, polyethylene terephthalate, polyether nitrile, polyimide, polyamide, polyamide imide, polytetrafluoroethylene, styrene-butadiene rubber, polyacrylonitrile, polymethyl acrylate, polymethylmethacrylate, polyvinyl chloride, polyvinylidene fluoride, or polyvinylidene chloride; and a thermosetting polymer having no conductivity such as an epoxy resin or an unsaturated polyester resin. These may be used alone or may be used as a mixture of two or more kinds thereof.

When the conductive member contains a conductive material and a polymer material, the content of the conductive material is preferably 20 to 95% by mass and more preferably 50 to 90% by mass with respect to the total mass of the conductive member. The content of the conductive material in the conductive member is preferably more than the content of the conductive filler in the conductive resin layer. With such a configuration, the contact resistance can be further reduced.

The conductive member is provided on the current collector; however, regarding the shape in the plane direction thereof, the conductive member may be provided on the entire surface of the current collector or may be provided only at an area necessary for performing electrical contact with the conductive filler contained in the conductive resin layer. In addition, the conductive member may be continuously provided in the plane direction or may be partially or intermittently provided. Examples of the shape thereof include various shapes such as a mesh shape, a stripe shape, a lattice shape, a dot shape, and a band shape. Further, the conductive member is preferably provided on at least a surface, which is in contact with the current collecting plate, of the current collector, but may be provided on both surfaces of the current collector.

The thickness of the conductive member is preferably 0.01 to 50 µm and more preferably 0.1 to 30 µm.

It is preferable that the electrical connection structure is obtained by applying an ink containing a conductive material and a solvent to a current collector to form a coating film, thereby forming a conductive member on the current collector. In addition, heat pressing may be further performed on the conductive member formed on the current collector. That is, the electrical connection structure may be obtained by applying an ink containing a conductive material and a solvent to a current collector to form a coating film, thereby forming a conductive member on the current collector, and then performing heat pressing on the conductive member. When the conductive member obtained by applying an ink containing a conductive material and a solvent contains a thermosetting polymer, the ink may contain a precursor of the thermosetting polymer (a non-crosslinked polymer having a crosslinking point, a crosslinking agent, and the like). Further, for the electrical connection structure, it is also preferable that the electrical connection structure is obtained by applying an ink containing a conductive material to a suitable base material (for example, a polyimide film) to form a coating film that is a conductive member, laminating the coating film and the current collector, then forming the coating film (the conductive member) to be integrated with the upper portion of the current collector by heat pressing, and removing the base material from the conductive member. With such a structure, the conductive filler in the conductive resin layer and the conductive member is more easily in contact with each other, and thus the contact resistance is further reduced.

Furthermore, it is preferable to have a structure in which at least a part of the conductive member gets into the surface of the conductive resin layer of the current collector, that is, a structure in which at least a part of the conductive member is buried into the inside from the surface of the conductive resin layer of the current collector or a structure in which at least a part of the conductive member extends beyond the surface of the conductive resin of the current collector and is present inside the conductive resin layer. With such a structure, the conductive filler in the conductive resin layer and the conductive member is more easily in contact with each other, and thus the contact resistance is further reduced.

Further, it is also preferable that the electrical connection structure be obtained by pasting the conductive member and the current collector to each other by a conductive adhesive member. When the conductive member and the current collector are pasted to each other by the conductive adhesive member, the in-plane variation of the contact resistance is reduced. That is, the electrical connection structure preferably has the conductive adhesive member disposed between the conductive resin layer and the current collector.

Moreover, when the conductive member has a laminate structure of two or more layers, at least two layers of the conductive member are preferably pasted to each other by a conductive adhesive member. With such a structure, the in-plane variation of the contact resistance can be reduced. That is, when the conductive member has a laminate structure of two or more layers, the electrical connection structure preferably has the conductive adhesive member disposed between at least two layers of the conductive member. Incidentally, the conductive adhesive member used in the electrical connection structure will be described in the section of a method for producing an electrical connection structure described below.

[Method for Producing Electrical Connection Structure]

The method for producing an electrical connection structure is not particularly limited, and examples thereof include 1) a method of transferring a conductive member, which is separately prepared from a current collector, onto a current collector; 2) a method of pasting a conductive member, which is separately prepared from a current collector, and a current collector to each other by a conductive adhesive member; and 3) a method including a step of applying an ink containing a conductive material onto a current collector including a conductive resin layer to obtain a laminate in which a coating film is formed on the current collector. These methods will be described.

[(1) Method of Transferring Conductive Member onto Current Collector]

In this method, a conductive member, which is separately prepared from a current collector including a conductive resin layer, is transferred onto a current collector.

As a method for separately preparing a conductive member from a current collector, for example, there is mentioned a method of applying an ink containing a conductive material and a solvent onto a heat-resistant film such as a polyimide film and drying the ink to obtain a conductive member. Further, when the conductive member contains a conductive material and a polymer material, this method is preferably employed. Incidentally, when the conductive member contains a conductive material and a polymer material, the conductive member can be obtained by, for example, a method of melting and mixing the conductive material and the polymer material (preferably, a thermoplastic polymer) and then rolling the melted-and-kneaded material by a heat pressing device or the like. That is, according to an embodiment of the present invention, there is provided a method for producing an electrical connection structure of the present invention including a step of applying an ink containing a conductive material to a current collector having a conductive resin layer containing a polymer material and a conductive filler, to obtain a laminate in which a coating film is formed on the current collector and a step of subjecting the laminate to heat pressing.

As a solvent used in the ink, for example, ketones such as acetone, aromatic hydrocarbon solvents such as toluene and xylene, polar solvents such as N-methyl-2-pyrrolidone (NMP), dimethylformamide (DMF), dimethylacetamide (DMAc), dimethylsulfoxide (DMSO), tetrahydrofuran (THF), and acetonitrile, and the like can be used. These may be used alone or may be used as a mixture of two or more kinds thereof.

The concentration of the conductive material in the ink is not particularly limited. The coating method is also not particularly limited, but examples thereof include coating with a brush, a bar coating method, a spray coating method, a screen printing method, and an inkjet method. Although the appropriate applied amount of the conductive material varies depending on the type of the conductive material and cannot be specified unconditionally, it is preferable to adjust the applied amount to such an amount that allows the contact resistance with the current collector to be small and the thickness of the conductive material not to be thick too much with respect to the thickness of the current collector. The drying temperature and the drying time are not particularly limited, and may be appropriately determined depending on a solvent in a range that deterioration of the material to be used does not occur.

As a method of transferring the conductive member obtained after drying or the conductive member obtained by melting and mixing, rolling, and the like onto the current collector, there are mentioned methods such as heat pressing using a known heat roll apparatus, heat pressing apparatus, or the like.

When the conductive member is prepared on the heat-resistant film, the electrical connection structure can be obtained by removing the heat resistant film after transfer.

[(2) Method of Pasting Conductive Member and Current Collector to Each Other by Conductive Adhesive Member]

In this method, a conductive member, which is separately prepared from a current collector including a conductive resin layer, is pasted onto a current collector by using a conductive adhesive member. A method for separately producing a conductive member from a current collector is the same as the contents described in the above-described section and thus the description thereof is omitted herein.

The conductive adhesive member contains a monomer or oligomer having two or more thermally polymerizable groups in one molecule, a conductive material, a polymerization initiator, or the like.

Examples of the monomer or oligomer include bifunctional (meth)acrylate such as ethylene glycol di(meth)acrylate diethylene glycol di(meth)acrylate, triethylene glycol di(meth)acrylate, tetraethylene glycol di(meth)acrylate, propylene glycol di(meth) acrylate, dipropyleneglycol di(meth) acrylate, tripropylene glycol di(meth)acrylate, 1,3-butanediol di(meth)acrylate, 1,4-butanediol di(meth)acrylate, or 1,6-hexanediol di(meth)acrylate; trifunctional (meth)acrylate such as trimethylolpropane tri(meth)acrylate or pentaerythritol tri(meth)acrylate; and tetrafunctional (meth) acrylate such as ditrimethylolpropane tetra(meth)acrylate or pentaerythritol tetra(meth)acrylate. In addition to the above-described examples, monomers such as urethane(meth)acrylate, a copolymerization oligomer thereof, and a copolymerization oligomer with acrylonitrile are exemplified, but the monomer or oligomer is not limited thereto. Incidentally, the term "(meth)acrylate" described in the present specification indicates methacrylate and/or acrylate.

Further, examples of the conductive material include carbon materials such as acetylene black, Ketjen black, carbon black, graphite, vapor-phase grown carbon fibers, and carbon nanotube; and powder of metals such as gold, silver, copper, aluminum, nickel, and magnesium. Examples of the polymerization initiator include dicumyl peroxide, di-t-butyl peroxide, t-butyl peroxybenzoate, t-butyl hydroperoxide, benzoyl peroxide, and cumene hydroperoxide.

The monomer or oligomer, the conductive material, and the polymerization initiator respectively may be used alone or may be used as a mixture of two or more kinds thereof.

In the electrical connection structure obtained by such a production method, the in-plane variation of the contact resistance is reduced.

[(3) Method of Applying Ink onto Current Collector]

In this method, an ink containing a conductive material is applied onto a current collector to form a coating film on the current collector, thereby obtaining a laminate formed from the current collector and the conductive member. Incidentally, when the obtained laminate is further subjected to heat pressing, the electrical contact between the conductive filler and the conductive member is more efficient, and thus the contact resistance can be further reduced, which is preferable.

The solvent used in the ink, the concentration of the conductive material in the ink, the coating method, the drying conditions, and the like are the same as the contents described in the section of the above (1), and thus the description thereof is omitted herein.

When heat pressing is performed after the laminate is obtained, heat pressing can be performed by using a known heat roll apparatus, heat pressing apparatus, or the like. As an example of heat pressing conditions, when the polymer material contained in the conductive resin layer is polypropylene, heat pressing is preferably performed at a temperature range of 170 to 200° C. under the pressing condition that the conductive resin layer does not become thin. In particular, heat pressing is preferably performed at a temperature slightly higher than a melting point of the polymer material contained in the conductive resin layer. With such a temperature range, at least a part of the polymer material is melted and the conductive filler in the conductive resin layer and the conductive member are easily in contact with each other, which is preferable. Further, heat pressing is preferable since a structure as described above in which at least a part of the conductive member gets into the surface of the conductive resin layer can be easily obtained.

Among the methods (1) to (3), the method (1) or (3) is preferable, and the method (3) is more preferable. That is, the production method preferably includes a step of applying an ink containing a conductive material to a current collector having a conductive resin layer containing a polymer material and a conductive filler, to form a coating film on the current collector and thereby obtaining a laminate formed from the current collector and the conductive member, and the production method further preferably includes a step of subjecting the laminate to heat pressing. In other words, according to a more preferred embodiment of the present invention, the method for producing an electrical connection structure of the present invention includes a step of applying an ink containing a conductive material to a current collector having a conductive resin layer containing a polymer material and a conductive filler, to obtain a laminate in which a coating film is formed on the current collector and a step of subjecting the laminate to heat pressing to form the conductive member on the current collector. The reason for this is that according to the embodiment, the electrical contact between the conductive filler in the conductive resin layer and the conductive member is efficiently and stably formed and the contact resistance can be further reduced.

When the conductive member has a laminate structure of two or more layers, at least two layers of the conductive member are preferably pasted to each other by the conductive adhesive member. When pasting is performed by using the conductive adhesive member, the in-plane variation of the contact resistance can be reduced. The same conductive adhesive member as described in the section of the above (2) can be used as the conductive adhesive member used at this time, and there is no particular limitation.

A contact resistance of the electrical connection structure obtained as described above is preferably 6Ω or less and more preferably 2Ω or less at a pressing pressure of 0.5 kg/cm². Specifically, the contact resistance can be measured by the method described in Examples.

One electrical connection structure may be used alone or two or more electrical connection structures may be combined (laminated) to each other and used. In the latter case, each electrical connection structure may be the same as or different to each other. Further, the number of the electrical connection structures in the latter case is not particularly limited, but is preferably 2 to 3.

The electrical connection structure is suitably used in a lithium ion secondary battery. For example, in the lithium ion secondary battery 10a, which is not a bipolar type, illustrated in FIG. 1, the electrical connection structure is suitably used for connection between the positive electrode current collecting plate 25 attached to the end portion of the battery and the positive electrode current collector 11 and/or for connection between the positive electrode current collectors 11 at the end portion of the battery, for example. Further, the electrical connection structure is also suitably used for connection between the negative electrode current collecting plate 27 attached to the end portion of the battery and the negative electrode current collector 12 and/or for connection between the negative electrode current collectors 12 at the end portion of the battery, for example. In the lithium ion secondary battery 10b, which is a bipolar type, illustrated in FIG. 2, the electrical connection structure is suitably used for connection between the outermost layer current collector of the positive electrode side 11a and the positive electrode current collecting plate 25 and/or for connection between the outermost layer current collector of the negative electrode side 11b and the negative electrode current collecting plate 27, for example.

The lithium ion secondary battery is not limited to a flat shape of laminate type, and may be a winding type lithium ion secondary battery. The winding type lithium ion secondary battery may have a barrel shape or a flat and rectangular shape obtained by modifying the barrel shape, and thus there is no particular limitation. As an outer casing material of the barrel shape, a laminate film may be used, or a barrel can (metal can) of a related art may be used, and thus there is no particular limitation. Preferably, the power generating element is encased with an aluminum laminate film. The weight reduction may be achieved with such configuration.

In the lithium ion secondary battery, known knowledge of the related art is appropriately employed for a main component member (an active material layer, an electrolyte layer, a lead, an outer casing material, or the like) other than the electrical connection structure. Further, the lithium ion secondary battery can be produced by a known production method of the related art.

The material for forming the current collecting plate (25, 27) which can be connected to the electrical connection structure is not particularly limited, and a known highly conductive material which has been conventionally used as a current collecting plate for a lithium ion secondary battery can be used. Preferred examples of the material for forming a current collecting plate include metal materials such as aluminum, copper, titanium, nickel, stainless steel (SUS), and an alloy thereof. From the viewpoint of light weightiness, corrosion resistance, and high conductivity, aluminum and copper are more preferable, and aluminum is particularly preferable. Incidentally, the same material or a different material may be used for the positive electrode current collecting plate 27 and the negative electrode current collecting plate 25.

The lithium ion secondary battery having the electrical connection structure can be suitably used as a power source or an auxiliary power source for operating a vehicle, such as an electric vehicle, a hybrid electric vehicle, a fuel cell electric vehicle, or a hybrid fuel cell electric vehicle, requiring a high mass energy density, a high mass output density, or the like.

Further, the electrical connection structure is not limited to the use for the lithium ion secondary battery, but can also be applied to a secondary battery of another type, and further applied to a primary battery.

EXAMPLES

The electrical connection structure will be described in more detail by means of the following Examples and Comparative Examples; however, the electrical connection structure is not limited only to the following Examples and Comparative Examples. Incidentally, current collectors 1 and 2, and a polymer material-containing conductive member 3 used in each of Examples and Comparative Examples were prepared as follows. Incidentally, hereinafter, unless otherwise stated, operations were conducted at room temperature (25° C.)

Preparation of Current Collector 1 Including Conductive Resin Layer (Current Collector 1)

75% by mass of polypropylene (PP) (trade name "SunAllomer (registered trademark) PL500A," manufactured by SunAllomer Ltd.), 20% by mass of acetylene black (AB) (DENKA BLACK (registered trademark) HS-100, manufactured by Denka Company Limited, (average particle diameter of primary particles: 36 nm), and 5% by mass of dispersant (manufactured by Sanyo Chemical Industries, Ltd., trade name "UMEX (registered trademark) 1001," maleic anhydride modified polypropylene) were melted and kneaded by a twin screw extruder under conditions including 180° C., 100 rpm, and a retention time of 10 minutes to obtain a material 1 for a current collector. Incidentally, the amount of each of the components represents a mixing ratio, and the total of polypropylene, acetylene black, and the dispersant is 100% by mass. The obtained material 1 for a current collector was subjected to rolling by a heat pressing device to obtain a current collector 1 having a thickness of 100 μm (also referred to as "20% AB-PP"). Incidentally, this current collector 1 was prepared on the assumption of the outermost layer current collector of the positive electrode side.

Preparation of Current Collector 2 Including Conductive Resin Layer (Current Collector 2)

81% by mass of nickel (Ni) filler T255 (standard particle diameter of primary particles: 2.2 to 2.8 μm) manufactured by Nikko Rica Corporation, 14% by mass of polypropylene (PP) (trade name "SunAllomer (registered trademark) PL500A," manufactured by SunAllomer Ltd.), and 5% by mass of dispersant (manufactured by Sanyo Chemical Industries, Ltd., trade name "UMEX (registered trademark) 1001," maleic anhydride modified polypropylene) were melted and kneaded by a twin screw extruder under conditions including 180° C., 100 rpm, and a retention time of 10 minutes to obtain a material 2 for a current collector. Incidentally, the amount of each of the components represents a mixing ratio, and the total of the nickel (Ni) filler, polypropylene, and the dispersant is 100% by mass. The obtained material 2 for a current collector was subjected to rolling by a heat pressing device to prepare a current collector 2 having a thickness of 100 μm (also referred to as "81% Ni-PP"). Incidentally, this current collector 2 was prepared on the assumption of the outermost layer current collector of the negative electrode side.

Preparation of Polymer Material-Containing Conductive Member 3

45% by mass of high-density polyethylene (HDPE) (SUNTEC (trademark) B680, manufactured by Asahi Kasei Chemicals Corporation), 50% by mass of acetylene black (AB) (DENKA BLACK (registered trademark) NH-100, manufactured by Denka Company Limited), and 5% by mass of dispersant (manufactured by Sanyo Chemical Industries, Ltd., trade name "UMEX (registered trademark) 1001," maleic anhydride modified polypropylene) were melted and kneaded by a twin screw extruder under conditions including 180° C., 100 rpm, and a retention time of 10 minutes to obtain a material 3 for a conductive member. Incidentally, the amount of each of the components represents a mixing ratio, and the total of high-density polyethylene, acetylene black, and the dispersant is 100% by mass. The obtained material 3 for a conductive member was subjected to rolling by a heat pressing device to obtain a polymer material-containing conductive member 3 having a thickness of 30 μm (also referred to as "50% AB-HDPE").

Measurement of Contact Resistance

The measurement of the contact resistance was conducted as follows. That is, a sample was interposed by two gold-plated discs each having a diameter of 20 mm and a constant load of 0.5 kg/cm$^2$ as a pressing pressure was applied to the sample. In a contact resistance measurement apparatus, using a four-terminal method, the frequency was decreased from 10 kHz, and a resistance value of the real axis obtained at a frequency of 1061 Hz where the real number component of impedance became constant in all samples was employed as a value of the contact resistance. Further, the sample was cut into a strip shape with a width of 1 cm, the resistance measurement was performed in the same manner by a four-terminal method, and the bulk resistance of the sample itself converted using a film thickness from the penetration resistance in the film thickness direction, the resistance of the metal foil, and the contact resistance of other parts were separately measured and subtracted therefrom. In this way, calculation was carried out such that only contact resistance of the part described by "/" in "Electrical connection structure" of Table 1 was included in the contact resistance ($\Omega$/cm$^2$) per unit area.

Example 1

A dispersion obtained by dispersing acetylene black (AB) (DENKA BLACK (registered trademark) HS-100, manufactured by Denka Company Limited, (average particle diameter of primary particles: 36 nm) in N-methyl-2-pyrrolidone (NMP) (AB concentration: 20% by mass) was prepared. The dispersion was applied onto a polyimide (Kapton (registered trademark), manufactured by DU PONT-TORAY CO., LTD.) film at an applied amount of 0.25 mg/cm$^2$. After drying at 90° C. for 3 hours, the obtained conductive member-attached film was superimposed to both surfaces of the current collector 1 prepared above such that the conductive member and the current collector 1 were in contact with each other, and then hot pressing roll at 180° C. was applied. Thereafter, the polyimide film was removed to obtain an electrical connection structure in which the acetylene black layer (thickness: 10 μm) serving as a conductive member is fixed to both surfaces of the current collector 1. The obtained electrical connection structure was punched into a size with a diameter of 20 mm, aluminum foils each having the same size (thickness: 20 μm) were pressed against the punched electrical connection structure from both sides, the obtained product was further interposed by two gold-plated discs from both sides, and then the obtained product was fixed to a contact resistance measurement apparatus manufactured by IMOTO MACHINERY CO., LTD. Then, the contact resistance was measured as described above.

Comparative Example 1

Aluminum foils were directly pressed against both surfaces of the current collector 1 in which the acetylene black layer is not pasted to both surfaces, the obtained product was further interposed by gold-plated discs from the both sides, and then the contact resistance was measured in the same manner as in Example 1.

Example 2

The contact resistance was measured in the same manner as in Example 1, except that copper foils were used instead of the aluminum foils.

Comparative Example 2

The contact resistance was measured in the same manner as in Comparative Example 1, except that copper foils were used instead of the aluminum foils.

Example 3

The contact resistance was measured in the same manner as in Example 1, except that stainless steel (SUS 316L) foils were used instead of the aluminum foils.

Comparative Example 3

The contact resistance was measured in the same manner as in Comparative Example 1, except that stainless steel (SUS 316L) foils were used instead of the aluminum foils.

Example 4

Two electrical connection structures obtained in Example 1 were superimposed to each other, the obtained product was interposed by two gold-plated discs from the both sides, and the contact resistance was measured by the above-described method.

Comparative Example 4

Two current collectors 1 were superimposed to each other, the obtained product was interposed by two gold-plated discs from the both sides, and the contact resistance was measured by the above-described method.

Example 5

5% by mass NMP solution of carbon nanotube manufactured by Cnano Technology Limited (LB100, average particle diameter: 11 nm, aspect ratio: 100 to 10000) was applied to both surfaces of the current collector 1 at an applied amount of about 0.3 mg/cm$^2$ with a brush. Thereafter, drying was performed under conditions including a drying temperature of 90° C. and a drying time of 3 hours to form a conductive member (thickness: 12 μm) on both surfaces of the current collector, thereby obtaining an electrical connection structure. The obtained electrical connection structure was punched into a circle shape with a diameter of 20 mm, aluminum foils were pressed against both surfaces, the obtained product was further interposed by two gold-plated discs from both sides, and the contact resistance was measured by the above-described method.

Example 6

The contact resistance was measured in the same manner as in Example 5, except that a hot pressing roll at 180° C. was further applied after the drying of the coating film.

Example 7

The polymer material-containing conductive member 3 was disposed on both surfaces of the current collector 1. Further, hot pressing roll at 190° C. was applied to obtain an electrical connection structure in which the polymer material-containing conductive member 3 (thickness: 10 μm) is provided on both surfaces of the current collector 1. Thereafter, the obtained electrical connection structure was interposed by two copper foils, the obtained product was further interposed by two gold-plated discs from both sides, and the contact resistance was measured by the above-described method.

Example 8

A dispersion obtained by dispersing a nickel (Ni) filler T255 manufactured by Nikko Rica Corporation (standard particle diameter of primary particles: 2.2 to 2.8 μm) in a NMP solution of polyvinylidene fluoride (PVdF) was prepared, and the dispersion was applied onto a polyimide (Kapton (registered trademark), manufactured by DU PONT-TORAY CO., LTD.) film at an applied amount of 6 mg/cm$^2$. The mass ratio of PVdF and the Ni filler at this time was 1:99. After drying under conditions including a drying temperature of 90° C. and a drying time of 3 hours, the obtained conductive member-attached film was superimposed to both surfaces of the current collector 2 prepared above such that the conductive member and the current collector 2 were in contact with each other, and then hot pressing roll at 190° C. was applied. Thereafter, the polyimide film was removed to obtain an electrical connection structure in which the conductive member (thickness: 30 μm) containing a nickel filler is formed on both surfaces of the current collector 2. The obtained electrical connection structure was punched into two pieces each having a diameter of 20 mm, the two punched pieces were superimposed, the obtained product was interposed by two gold-plated discs from both sides, and then the contact resistance was measured by the above-described method.

Comparative Example 5

The contact resistance was measured in the same manner as in Example 8, except that a dispersion of a Ni filler was not applied to both surfaces of the current collector 2.

Example 9

The electrical connection structure obtained in Example 1 and the electrical connection structure obtained in Example 8 were superimposed to each other to obtain a laminate. The obtained laminate was interposed by two gold-plated discs, and the contact resistance was measured by the above-described method.

Comparative Example 6

The current collector 1 and the current collector 2 were superimposed to each other to obtain a laminate. The obtained laminate was interposed by two gold-plated discs, and the contact resistance was measured by the above-described method.

Example 10

7% by mass of carbon nanotube (manufactured by Cnano Technology Limited, trade name: FloTube 9000, average diameter: 10 to 15 nm, average fiber length: 10 μm), 70% by mass of trimethylol propane triacrylate, 18% by mass of tetraethylene glycol diacrylate, and 5% by mass of di-t-butyl peroxide were mixed under stirring to prepare a conductive adhesive member (A). Incidentally, the amount of each of the components represents a mixing ratio, and the total of carbon nanotube, trimethylol propane triacrylate, tetraethylene glycol diacrylate, and di-t-butyl peroxide is 100% by mass.

The conductive adhesive member (A) was applied to both surfaces of the current collector 1 obtained above such that the thickness after drying became about 20 μm, the conductive member-attached film obtained in Example 1 was further superimposed thereon such that the conductive adhesive member (A) and the conductive member were in contact with each other, after left to stand at room temperature (25° C.) at half a day, the polyimide film was removed to obtain an electrical connection structure in which the acetylene black layer (thickness: 10 μm) serving as a conductive member is fixed on both surfaces of the current collector 1 by the conductive adhesive member (A). The obtained electrical connection structure was punched into a size with a diameter of 20 mm, copper foils each having the same size were pressed against the punched electrical connection structure from both sides, the obtained product was further interposed by two gold-plated discs from both sides, and the contact resistance was measured by the above-described method.

Example 11

The above-described conductive adhesive member (A) was applied to one surface of the electrical connection structure obtained in Example 1 and one surface of the electrical connection structure obtained in Example 8 such that the thickness after drying became about 20 μm, and the electrical connection structure of Example 1 and the electrical connection structure of Example 8 were superimposed to each other to obtain a laminate. The laminate was interposed by two gold-plated discs from the outside and held at 45° C. for 30 minutes, and then the contact resistance was measured by the above-described method.

Example 12

7 parts by mass of liquid epoxy resin [CELLOXIDE 2021P (alicyclic epoxy resin; manufactured by DAICEL CORPORATION)], 15 parts by mass of multifunctional epoxy resin [MARPROOF G2050M (manufactured by NOF CORPORATION)], 75 parts by mass of methyl ethyl ketone, 3 parts by mass of acetylene black, and 0.5 part by mass of curing agent [San-Aid SI-60 (manufactured by SANSHIN CHEMICAL INDUSTRY CO., LTD.)] were mixed to prepare an ink for a conductive member.

The ink for a conductive member was applied to both surface of the current collector 1 prepared above by using an applicator with a gap of 30 μm, and subsequently, the ink was vacuum-dried at 110° C. for 3 hours to be subjected to solvent removal and curing, thereby obtaining an electrical connection structure in which a layer of a conductive member formed from acetylene black and an epoxy resin is fixed on both surfaces of the current collector 1. The obtained electrical connection structure was punched into a size with a diameter of 20 mm, aluminum foils each having the same size (thickness: 20 μm) were pressed against the punched electrical connection structure from both sides, the obtained product was further interposed by two gold-plated discs from both sides, and the contact resistance was measured in the same manner as in Example 1.

The measurement results of the contact resistance of each Example and each Comparative Example are presented in the following Table 1.

TABLE 1

| | Electrical connection structure | Contact resistance (Ω) |
|---|---|---|
| Example 1 | Both-side AB transfer 20% AB-PP/Al | 0.25 |
| Comparative Example 1 | 20% AB-PP/Al | 60 |
| Example 2 | Both-side AB transfer 20% AB-PP/Cu | 0.68 |
| Comparative Example 2 | 20% AB-PP/Cu | 6.8 |
| Example 3 | Both-side AB transfer 20% AB-PP/SUS | 1.22 |
| Comparative Example 3 | 20% AB-PP/SUS | 35 |
| Example 4 | Both-side AB transfer 20% AB-PP/Both-side AB transfer 20% AB-PP | 0.5 |
| Comparative Example 4 | 20% AB-PP/20% AB-PP | 10 |
| Example 5 | Both-side CNT coating 20% AB-PP/Al | 20 |
| Example 6 | Both-side CNT coating + heat pressing 20% AB-PP/Al | 2.6 |
| Example 7 | 20% AB-PP/50% AB-HDPE/Cu | 0.32 |
| Example 8 | Both-sideNi transfer 81% Ni-PP/Both-side Ni transfer 81% Ni-PP | 0.1 |
| Comparative Example 5 | 81% Ni-PP/81% Ni-PP | 10.6 |
| Example 9 | Both-sideNi transfer 81% Ni-PP/Both-side AB transfer 20% AB-PP | 0.4 |
| Comparative Example 6 | 81% Ni-PP/20% AB-PP | 130 |
| Example 10 | Carbon nanotube (CNT)-containing layer/20% AB-PP/CNT-containing layer/Both-side AB transfer 20% AB-PP | 0.69 |
| Example 11 | Both-side Ni transfer 81% Ni-PP/Both-side AB transfer 20% AB-PP | 0.45 |
| Example 12 | Both-side AB coating 20% AB-PP/Al | 2.5 |

As clearly seen from the above Table 1, by providing the conductive member on the surface of the current collector including a conductive resin layer, it is found that the contact resistance between the current collector and the metal plate used as the current collecting plate can be considerably reduced, and it is found that the contact resistance between the current collectors can also be considerably reduced. In particular, it is found that in the electrical connection structure in which the conductive member is pasted to the surface of the current collector by heat pressing, even via the conductive adhesive member, the contact resistance can be considerably reduced.

Incidentally, the present application is based on Japanese Patent Application No. 2014-170633 filed on Aug. 25, 2014, and its enclosure is entirely incorporated herein by reference.

The invention claimed is:

1. An electrical connection structure comprising:
    a current collector which comprises a conductive resin layer comprising a polymer material and a conductive filler; and
    a conductive member which is in electrical contact with the conductive filler, wherein
    the conductive member contains a conductive material having a fiber shape, a plate shape, a shape including a lump, a mesh shape, or a granular shape having an average particle diameter of 0.01 to 10 μm,
    the electrical connection structure has a structure in which at least a part of the conductive member extends beyond the surface of the conductive resin layer and is present inside the conductive resin layer, and
    a contact resistance at a pressing pressure of 0.5 kg/cm$^2$ is 2Ω or less.

2. The electrical connection structure according to claim 1, wherein the electrical connection structure is obtained by applying an ink comprising a conductive material to the current collector to form a coating film on the current collector.

3. The electrical connection structure according to claim 1, wherein the conductive member comprises at least one conductive material selected from the group consisting of 1) a metal having an ionization tendency lower than that of 2) iron, 3) titanium, 4) zirconium, 5) tantalum, 6) niobium, 7) an alloy having a main component selected from iron, titanium, zirconium, tantalum, niobium, or a metal having an ionization tendency lower than that of iron, or 8) a conductive carbon.

4. The electrical connection structure according to claim 3, wherein the conductive member further comprises a polymer material, and
a content of the conductive material in the conductive member is more than a content of the conductive filler in the conductive resin layer.

5. The electrical connection structure according to claim 1, wherein the conductive member is comprised of a conductive carbon.

6. The electrical connection structure according to claim 3, wherein the conductive member further comprises an epoxy resin.

7. The electrical connection structure according to claim 1, wherein a conductive adhesive member is disposed between the conductive member and the current collector.

8. The electrical connection structure according to claim 1, wherein the conductive member has a laminate structure of two or more layers and a conductive adhesive member is disposed between at least two layers of the conductive member.

9. A method for producing the electrical connection structure according to claim 1, comprising:
a step of applying an ink comprising the conductive material to the current collector to form a laminate in which a coating film is formed on the current collector.

10. The method for producing the electrical connection structure according to claim 9, further comprising a step of subjecting the laminate to heat pressing.

11. The electrical connection structure according to claim 1, wherein the metal having the ionization tendency lower than that of iron is selected from cobalt, nickel, tin, antimony, copper, silver, palladium, iridium, platinum, or gold.

12. The electrical connection structure according to claim 1, wherein
the conductive material has the fiber shape, and
the fiber shape has an average fiber length of 0.1 to 100 µm and an average diameter of 10 nm to 10 µm.

* * * * *